United States Patent …

(12) United States Patent
Giovinco et al.

(10) Patent No.: US 7,012,601 B2
(45) Date of Patent: Mar. 14, 2006

(54) LINE DRAWING FOR A VOLUMETRIC DISPLAY

(75) Inventors: Michael G. Giovinco, Cambridge, MA (US); Joshua Napoli, New Smyrna Beach, FL (US)

(73) Assignee: Actuality Systems, Inc., Bedford, MA (US)

( * ) Notice: Subject to any disclaimer, the term of this patent is extended or adjusted under 35 U.S.C. 154(b) by 574 days.

(21) Appl. No.: 09/828,770

(22) Filed: Apr. 9, 2001

(65) Prior Publication Data

US 2002/0196253 A1 Dec. 26, 2002

Related U.S. Application Data

(60) Provisional application No. 60/230,972, filed on Sep. 7, 2000.

(51) Int. Cl.
*G06T 15/00* (2006.01)

(52) U.S. Cl. ............ 345/419; 345/443; 345/424; 345/653

(58) Field of Classification Search .......... 345/443, 345/424, 419, 653, 6, 7; 353/10, 122, 121
See application file for complete search history.

(56) References Cited

U.S. PATENT DOCUMENTS

| 4,371,933 A | 2/1983 | Bresenham et al. ....... 364/300 |
| 4,648,045 A | 3/1987 | Demetrescu ............... 364/518 |
| 4,839,828 A | 6/1989 | Elsner et al. .............. 364/518 |
| 4,983,031 A | 1/1991 | Solomon |

(Continued)

FOREIGN PATENT DOCUMENTS

| EP | 0312 720 | 4/1989 |
| EP | 0827 129 | 3/1998 |

OTHER PUBLICATIONS

Jack Bresenham, "A Linear Algorithm for Incremental Digital Display of Circular Arcs," Comunications of the ACM, vol. 20, No. 2, Feb. 1997.

(Continued)

*Primary Examiner*—Matthew C. Bella
*Assistant Examiner*—Tam Tran
(74) *Attorney, Agent, or Firm*—Fish & Richardson P.C.

(57) ABSTRACT

A method for rapid rendering of a desired line in a volumetric display having a rotatable screen includes stepping the rotatable screen through a sequence of angular positions and, at each angular position, rendering, on the rotatable screen, a rasterized approximation of a line segment containing an intersection of the desired line and the rotatable screen.

28 Claims, 4 Drawing Sheets

U.S. PATENT DOCUMENTS

| | | | |
|---|---|---|---|
| 4,987,554 A | | 1/1991 | Kaufman ..................... 364/522 |
| 5,148,310 A | * | 9/1992 | Batchko ..................... 359/479 |
| 5,515,484 A | * | 5/1996 | Sfarti et al. .................. 395/124 |
| 5,537,251 A | | 7/1996 | Shimada |
| 5,574,836 A | | 11/1996 | Broemmelsiek ............ 395/127 |
| 5,936,767 A | | 8/1999 | Favalora |
| 6,049,317 A | | 4/2000 | Thompson et al. |
| 6,052,100 A | * | 4/2000 | Soltan et al. ................... 345/6 |
| 6,489,961 B1 | * | 12/2002 | Baxter et al. ............... 345/424 |

OTHER PUBLICATIONS

B.G. Blundell et al., "*A graphics hierarchy for the visualization of 3D images by means of a volumeric display system,*" Proceedings of the Region 10 Annual International Conference. Singapore, Aug. 22-26, 1994, NY, IEEE, US, vol. 1, conf9, pp. 1-5.

"Optimized Drawing of Filled and Unfilled Circles in a Two-Dimensional Graphics System", *IBM Technical Disclosure Bulletin*, vol. 33, No. 6B, Nov. 1, 1990, pp. 291-295.

B. Lacotte, "Elimination of Keystone and Crosstalk Effects in Stereoscopic Video", *Rapport Technique De L'Inrs-Telecommunications*, No. 95-31, Dec. 22, 1995, pp. 1-27.

\* cited by examiner

LINE DRAWING FOR A VOLUMETRIC DISPLAY

CLAIM OF PRIORITY

Under 35 USC §119(e)(1), this application claims the benefit of the priority date of U.S. Provisional Patent Application Serial No. 60/230,972, filed on Sep. 7, 2000, the contents of which are herein incorporated by reference.

This invention relates to computer graphics, and in particular, to the rendering of a straight line in a volumetric display in which the voxels are arranged on a cylindrical coordinate grid.

BACKGROUND

Many computer-implemented displays consist of two-dimensional arrays of individual picture elements, or pixels. To form an image, a rasterizer selectively illuminates these pixels. Because the individual pixels are so small, the display appears, to a human viewer, to be a continuous rendering of an image. This illusion is particularly effective for complex images of continuous tones such as photographs.

For simple geometric shapes, however, the pixelated nature of the display can become apparent to the human viewer. For example, if the rasterizer is instructed to draw a straight line, there is no guarantee that the points on that desired line will coincide with the pixels that are available for rendering the line. As a result, the desired line is often rendered as a rasterized line of pixels that are close to, but not necessarily coincident with, the desired line. This results in rasterized lines that have a jagged or echeloned appearance.

In the course of rendering an image, a large number of straight lines and line segments are often drawn. As a result, given a desired line, the rasterizer must frequently select those pixels that will minimize the jagged appearance of the resulting rasterized line. A straightforward mathematical approach is to use the equation of the desired line and the coordinates of the available pixels to minimize a least-square error across all points on the line. While such an approach has the advantage of globally optimizing the selection of pixels on the rasterized line, the large number of floating-point operations required causes this approach to be prohibitively time-consuming.

To meet constraints on speed, rasterizers typically implement rasterization methods that avoid time-consuming floating-point operations. Among the methods that meet the foregoing constraints is that taught in Bresenham, J. E., Algorithm for Computer Control of a Digital Plotter, IBM System Journal, Vol. 4, pp.25–30, 1965, the contents of which are herein incorporated by reference. Using only integer operations, the Bresenham algorithm reduces the choice of what pixel to select to an examination of the sign of a discriminant.

Even faster rasterization methods exist that select not one but multiple points on the rasterized line based on the outcome of a single decision. There also exist a variety of rasterization methods aimed at rendering conic sections and quadric sections on a pixelated display.

However, the foregoing rasterization methods all rely on the assumption that the array of pixels is arranged in a uniform rectangular grid that can readily be modeled by a Cartesian coordinate system. This was a reasonable assumption given the prevalence of two-dimensional displays such as computer monitors and printers at the time these algorithms were developed.

Since then, however, volumetric, or three-dimensional displays have been developed. Such displays permit the generation, absorption, or scattering of visible radiation from a set of localized and specified regions within a volume. Examples of such systems are taught in Hirsch U.S. Pat. No. 2,967,905, Ketchpel U.S. Pat. No. 3,140,415, Tsao U.S. Pat. No. 5,754,147, and on pages 66–67 of Aviation Week, Oct. 31, 1960.

SUMMARY

The method of the invention provides for rapid rendering of a desired line in a volumetric display having a rotatable screen. The method includes stepping the rotatable screen through a sequence of angular positions. At each angular position, a rasterized approximation of a line segment containing an intersection of the desired line and the rotatable screen is rendered on the screen.

In one aspect of the invention, the screen is positioned at a first angular position in which the screen is coplanar with an entry plane. A first and second voxel are then selected on the basis of the geometric relationship between the desired line and the entry plane. In particular, the first voxel corresponds to an intersection of the desired line with the entry plane; and the second voxel corresponds to a projection, onto the entry plane, of an intersection of the desired line with an exit plane. A connecting segment that connects the first and second voxels is then rasterized by rendering selected voxels on the two-dimensional screen.

The rasterization of the connecting segment can be carried out by an algorithm such as the Bresenham algorithm. However, any two-dimensional rasterization algorithm can be used to rasterize the connecting segment.

In one aspect of the invention, the first voxel is selected by obtaining constants that define the desired line in Cartesian coordinates and obtaining an angle descriptive of the angular position of the entry plane. On the basis of the constants and the angle, a trigonometric transformation determines cylindrical coordinates of the intersection of the desired line with the entry plane.

In some cases, the optical layout of a volumetric display introduces distortions that are corrected by additional, optional steps in the method. For example, the distortion introduced by rotation of the imaging screen can be corrected by generating rotated coordinates corresponding to the first voxel, the rotated coordinates corresponding to rotation about a selected angle. Similarly, correction of distortion resulting from keystoning can be achieved by generating projected coordinates corresponding to the first voxel, the projected coordinates being obtained by correction for keystone distortion.

These and other features and advantages of the invention will be apparent from the following detailed description, and the figures, in which:

DETAILED DESCRIPTION

Figure 1:
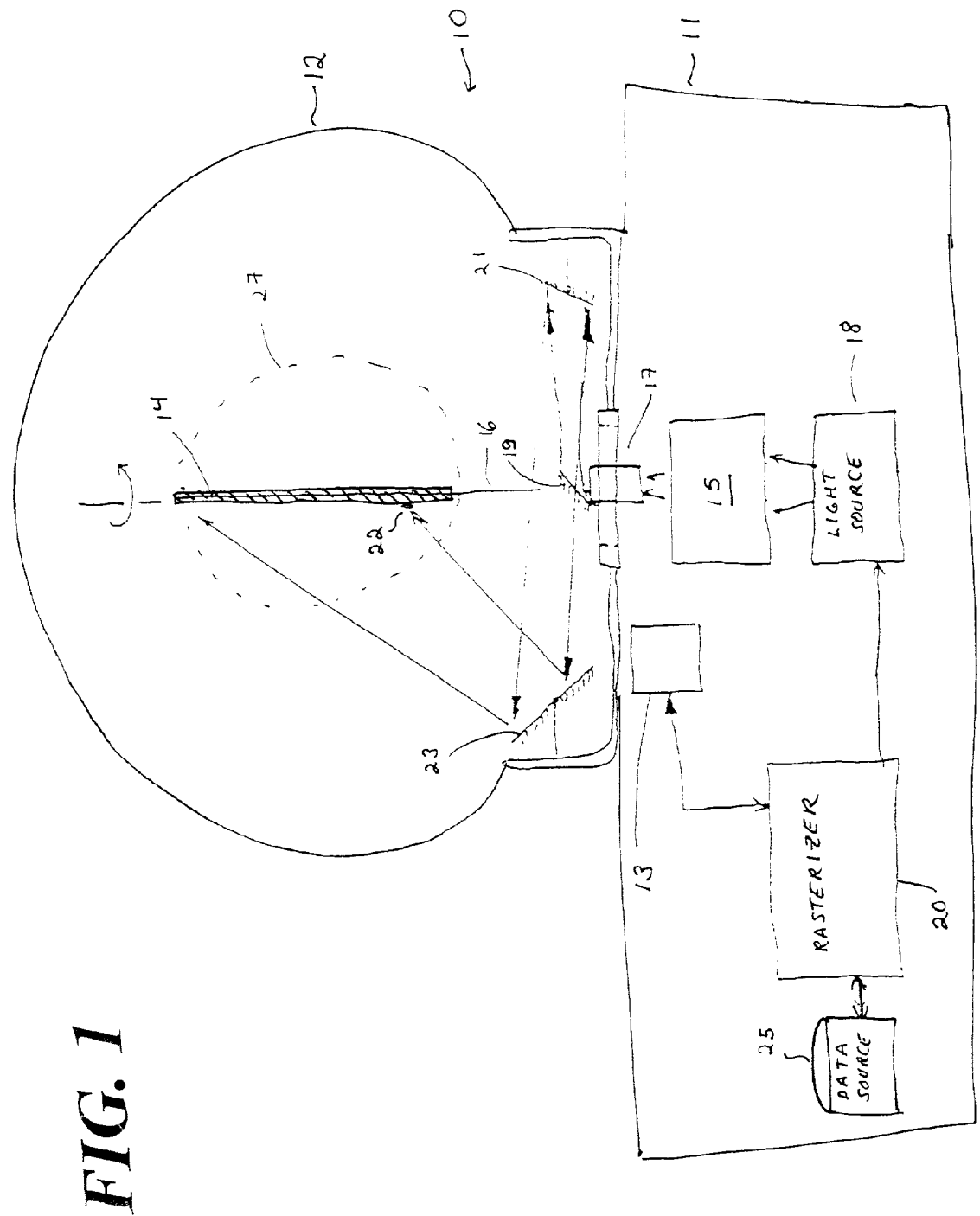
FIG. 1 is a volumetric display.

A volumetric display 10 for practice of the invention, shown in FIG. 1, includes a base section 11 and a rotating section 12. A motor controller 13 causes a motor (not shown) to spin the rotating section 12 rapidly about an axis 16 coupled to the base section 11.

Within the base section 11, a light source 18, under the control of a rasterizer 20, generates a spatially varying pattern of light for illuminating selected pixels 22 on the imaging screen 14 at successive instants. A typical light source 18 includes a micro-mechanical array of individually addressable mirrors whose orientations are under the control of the rasterizer 20. This light is passed into the rotating section 12 through a stationary optical subsystem 15 in optical communication with a rotating optical subsystem 17 coupled to the rotating section 12 and coaxial with the axis 16.

Light from the rotating optical subsystem 17 is projected onto a central mirror 19 disposed above the rotating optical subsytem 17 and angled to direct light toward a first relay mirror 21 disposed at the periphery of the base section 11. The first relay mirror 21 is angled to reflect light to a second relay mirror 23 at the periphery of the base section 11. The second relay mirror 23 is angled to direct light from the first relay mirror 21 toward the imaging screen 14.

These pixels to be illuminated on the imaging screen 14, and the instants at which they are to be illuminated, are determined by the rasterizer 20 on the basis of data indicative of the angular position of the imaging screen 14 (as supplied by the motor controller 13) and data descriptive of a three-dimensional image (as stored in a data source 25).

As the rotating section 12 spins around the axis 16, the imaging screen 14 sweeps out a display volume 27 within the rotating section 12. If the rotating section 12 were to spin rapidly enough, and if the successive instants of illumination were to be separated by sufficiently brief time intervals, a continuous curve would appear to hang in mid-air within the display volume 27.

Figure 2:
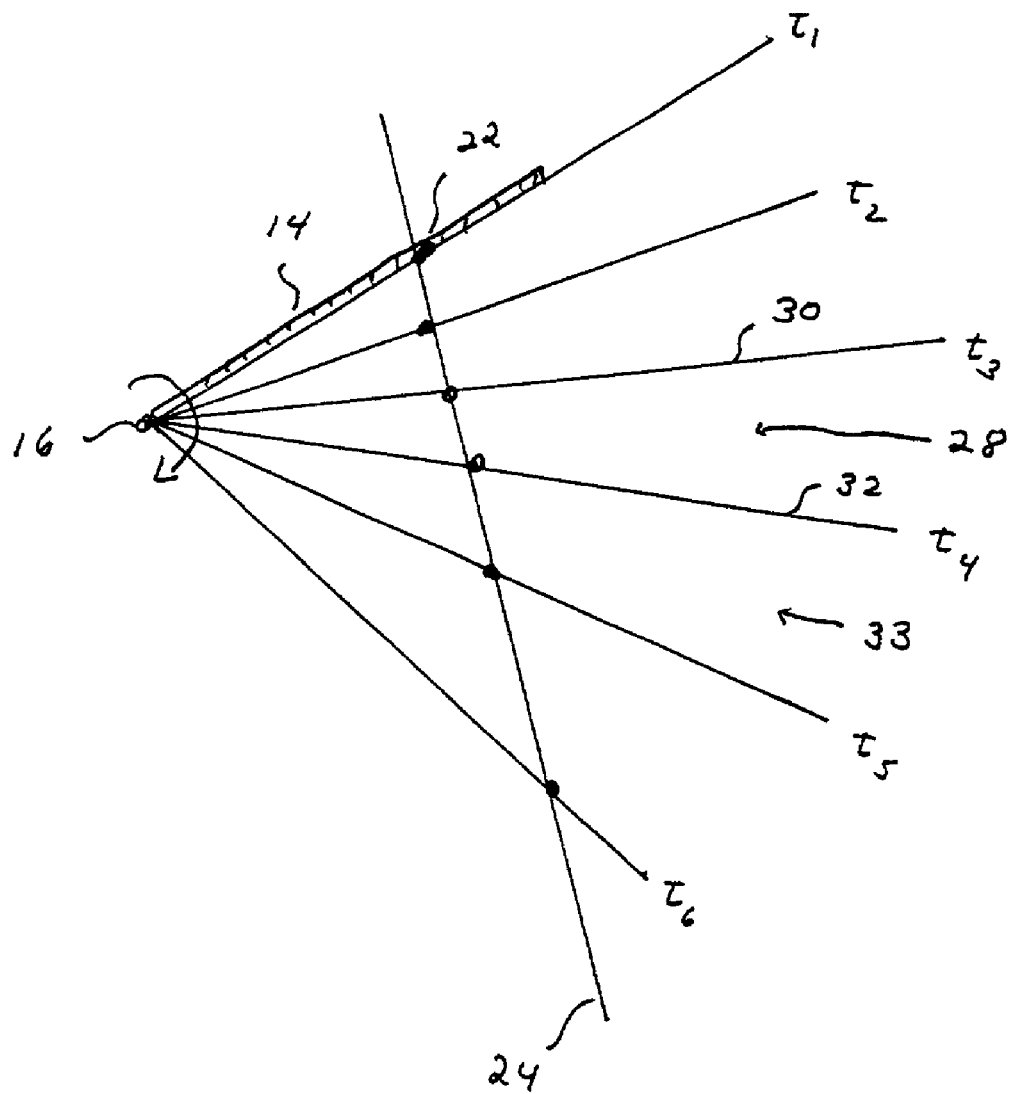
FIG. 2 is a planar view of the display volume.

FIG. 2 illustrates the projection onto a plane perpendicular to the axis 16 of a desired line 24 to be approximated by the rasterizer 20. In FIG. 2, the imaging screen 14 is shown in six successive instants as it rotates around the axis 16, now perpendicular to the page. At each of the six instants, the light source 18, under the control of the rasterizer 20, illuminates a pixel 22 on the imaging screen 14. As shown in FIG. 2, by aiming the light source 18 at the correct pixel and firing the light source 18 at the right times, it is possible to trace out a rasterized line that approximates the desired line 24. It is the function of the rasterizer 20 to correctly aim and fire the light source 18 so as to trace out this desired line 24.

To aim the light source 18, the rasterizer 20 needs a way to identify points in space. In other words, the rasterizer 20 needs a coordinate system. One possible coordinate system is a Cartesian coordinate system.

Using a Cartesian coordinate system, the rasterizer 20 would draw the desired line in FIG. 2 by specifying, for example, that at time t1, the light-source 18 should aim 30 units north, at time t2, the light-source 18 should aim 29 units north, 1 unit east and 1 unit in elevation, at time t3, the light-source 5 should aim 28 units north, 2 units east and 2 units in elevation, and so on. To ensure that the imaging screen 14 is at the appropriate location, the rasterizer 20 also has to specify the values of the times t1, t2 and t3 based on how fast the imaging screen 14 spins. Although the spinning of the imaging screen 14 can be resolved into a north-south component and an east-west component, this is a computationally taxing exercise that can easily be avoided by using a cylindrical coordinate system.

As an alternative, the rasterizer 20 could draw the line in FIG. 2 in cylindrical coordinates by specifying, for example, that at time t1, the light source 18 should aim 30 units away from the axis 16 at a 90 degree angle, at time t2, the light source 18 should aim 29.02 units from the axis 16 at an angle of 88.03 degrees and point up by 1 unit of elevation, and at time t3, the light source 18 should aim at 28.07 units from the axis 16 at an angle of 85.91 degrees and point up by 2 units of elevation. This would, of course, draw the same line that was drawn using Cartesian coordinates. The advantage of using cylindrical coordinates becomes apparent when it comes time to specify when to fire the light source 18. Because the imaging screen 14 is spinning, it is far more natural to represent its motion in terms of degrees per second than it is to resolve its motion into a north-south component and an east-west component. For this reason, calculations involving motion of the imaging screen 14 in a volumetric display 10 are best performed in terms of a cylindrical coordinate system.

The process of rendering a line in a cylindrical coordinate system is fundamentally different from that of rendering a line in a Cartesian coordinate system. In a Cartesian coordinate system, a line has a constant slope. A unit change in one direction always results in the same change in the remaining two directions, regardless of where that change occurs. This is not the case in a cylindrical coordinate system.

In a cylindrical coordinate system, the slope of a line can vary dramatically with position along the line. In contrast to a Cartesian coordinate system, in which the slope of a line is constant at all points on the line, the slope of a line in a cylindrical coordinate system can vary significantly along the line. This is because the coordinate grid in a cylindrical coordinate system is not a spatially uniform grid, as is the coordinate grid in a Cartesian coordinate system.

For those portions of the line that are closest to the axis of the cylindrical coordinate system, the change in distance of the line from the origin changes very slowly with angle. For those portions of the line that are far from the axis of the cylindrical coordinate system, even a small change in angle results in a huge change in radial distance from the axis.

In the volumetric display 10 of FIG. 1, the rasterizer 20 causes a sequence of images to be projected onto the imaging screen 14. The particular image displayed on the imaging screen 14 depends on the angular position of the imaging screen 14 as it rotates about its axis 16. The image does not, however, vary continuously with angular position of the screen 14. Instead, the displayed image remains constant for a particular range of angular positions, changing only when the angular position of the screen 14 crosses one of a plurality of threshold angles. These threshold angles are typically equally spaced and very close together. In the illustrated embodiment, the angular separation between threshold angles is between 30 minutes and 1 degree of arc.

The display volume of the volumetric display 10 can thus be viewed as a cylindrical volume of intersecting planes, all of which intersect at the axis 16 about which the imaging screen 14 rotates. In the cross-sectional view of FIG. 2, each pair of intersecting planes defines a wedge-shaped slice 28. The two planes that bound a slice are referred to as the "entry plane 30" and the "exit plane 32" for that slice 28. As the screen 14 rotates about its axis 16, it becomes momentarily coplanar with the entry plane 30 for a particular slice 28, it then traverses that slice 28, and becomes coplanar with the exit plane 32 for that slice 28. As is apparent from FIG. 2, the exit plane 32 for a slice 28 is thus coplanar with the entry plane for a following slice 33.

When the imaging screen 14 is coplanar with any entry plane 30, the image displayed on the screen 14 is permitted to change. As the imaging screen 14 traverses a slice 28, the image displayed on the screen 14 remains constant. Data generally available to the rasterizer 20 for drawing the desired line 24 includes data from which the Cartesian coordinates of at least two points $(x_o, y_0, z_0)$ and $(x_1, y_1, z_1)$ can be obtained. From these two points, the following constants descriptive of the desired line 24 are calculated:

$$\theta_t = \arctan\left(\frac{y_1 - y_0}{x_1 - x_0}\right)$$

$$d = \frac{|x_0 \cdot y_1 - x_1 \cdot y_0|}{\sqrt{(x_1 - x_0)^2 + (y_1 - y_0)^2}}$$

$$\gamma = \frac{d \cdot (z_1 - z_0)}{\sqrt{(x_1 - x_0)^2 + (y_1 - y_0)^2}}$$

$$h_t = z_0 - \frac{(x_0 \cdot (x_1 - x_0) - y_0 \cdot (y_1 - y_0)) \cdot (z_1 - z_0)}{(x_1 - x_0)^2 + (y_1 - y_0)^2}$$

These constants need only be computed once for each desired line 24. In the illustrated embodiment, d is a 16-bit fixed point signed number, $h_t$ is a 40 bit fixed point number, and $\gamma$ is a 16-bit fixed point signed number.

To improve performance, values of $\theta_t$ are obtained from a look-up table. The look-up table is kept as small as possible by selecting a resolution of $\theta_t$ that is coarse, but not so coarse as to significantly degrade the accuracy of the rasterization. In particular, if the resolution of $\theta_t$ is coarser than the $\theta$ resolution of the display space, values of $\theta$ corresponding to different planes can be mapped to the same r and h values. This causes an undesirable loss of resolution in the $\theta$ direction.

In the illustrated embodiment, the number of entries in the look-up table is double the $\theta$ resolution of the display space. This ratio provides sufficient accuracy to eliminate most visual artifacts and to avoid degrading the minimum resolution of the display 10.

Given these constants, the rasterizer 20 then obtains the cylindrical coordinates of the intersection of the desired line 24 with each of the intersecting planes, as shown in FIG. 2. These intersection points are given by $$r(\theta) = d \cdot \sec(\theta - \theta_t)$$

$$h(\theta) = h_t + \gamma \cdot \tan(\theta - \theta_t)$$

where $\theta$ is the angle associated with a particular intersecting plane.

Figure 3:
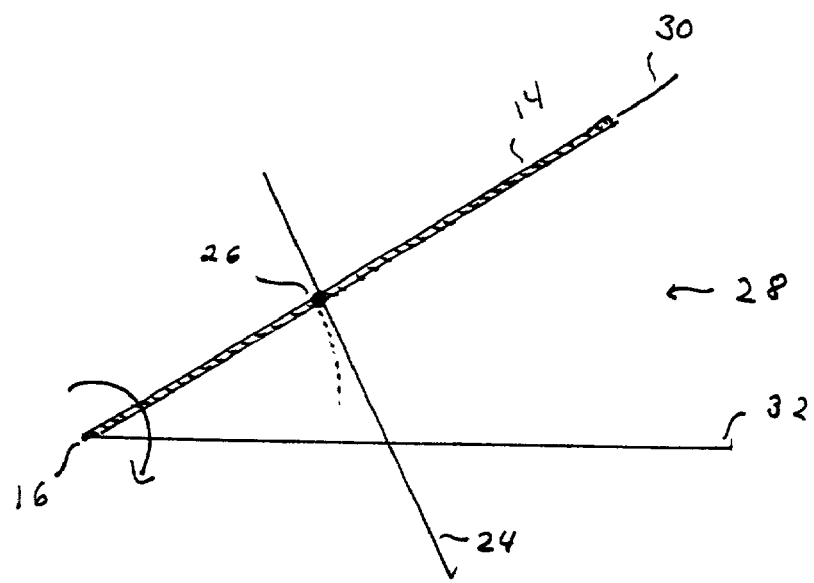
FIGS. 3 and 4 show one method of rasterizing a line in a three-dimensional space.

One approach, shown in FIG. 3, to rendering the desired line 24 is to select that voxel 26 on the entry plane 30 that is closest to the intersection of the desired line 24 with that plane. The rasterizer 20 then illuminates that selected voxel 26 throughout an interval beginning with the instant the screen 14 becomes coplanar with that entry plane 30 and ending just before the screen 14 rotates into the exit plane 32 for that slice 28. This process, when repeated for successive slices, results in a rasterized line that approximates the desired line 24.

Figure 4:
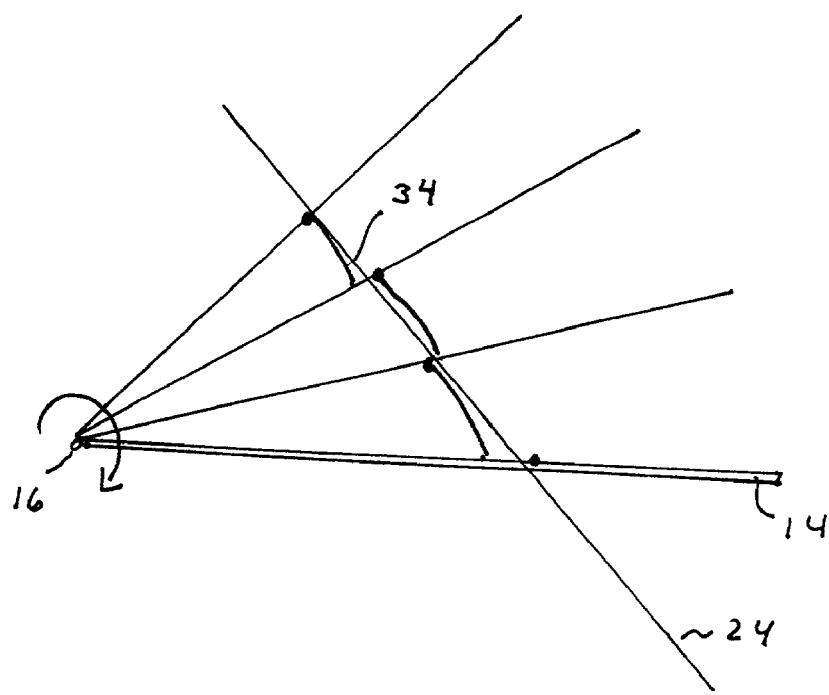

A difficulty with the foregoing method is that unless the $\theta$ resolution is prohibitively high, the resulting rasterized line appears as a discontinuous sequence of circular arcs 34, as shown in FIG. 4. Each arc 34 has an arc length proportional to the angle swept out by the screen 14 as it traverses a particular slice 28.

Figure 5:
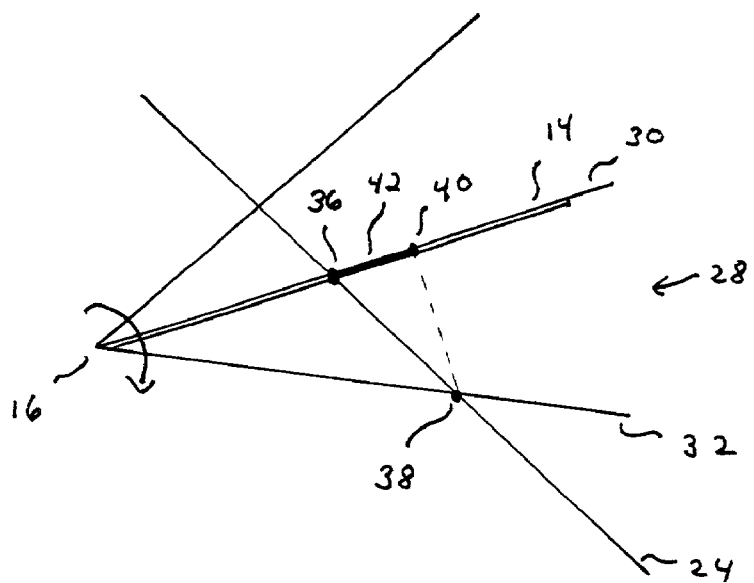
FIGS. 5 and 6 show a second method of rasterizing a line in a three-dimensional space.

To remedy this, the rasterizer 20 determines the intersection points of the desired line 24 with the entry plane 30 and the exit plane 32 (hereafter referred to as the "entry point 36" and "exit point 38" respectively) as described above. When the screen 14 becomes coplanar with the entry plane 30, the rasterizer 20 renders a voxel corresponding to the entry point 36. In addition, the rasterizer 20 determines the projection of the exit point 38 (hereafter referred to as the "projected exit point 40") onto the entry plane 30, as shown in FIG. 5. This defines a connecting segment 42 on the screen 14 that connects the entry point 36 with the projected exit point 40. The rasterizer 20 then renders voxels on the screen 14 that rasterize this connecting segment 42. This rasterization can be carried out using conventional two-dimensional rasterization algorithms, such as the Bresenham algorithm.

The rasterization method of the invention thus achieves three-dimensional rasterization in a cylindrical coordinate system by performing a sequence of two-dimensional rasterizations on the imaging screen 14 as that imaging screen 14 sweeps out a cylinder in a three-dimensional volume.

Figure 6:
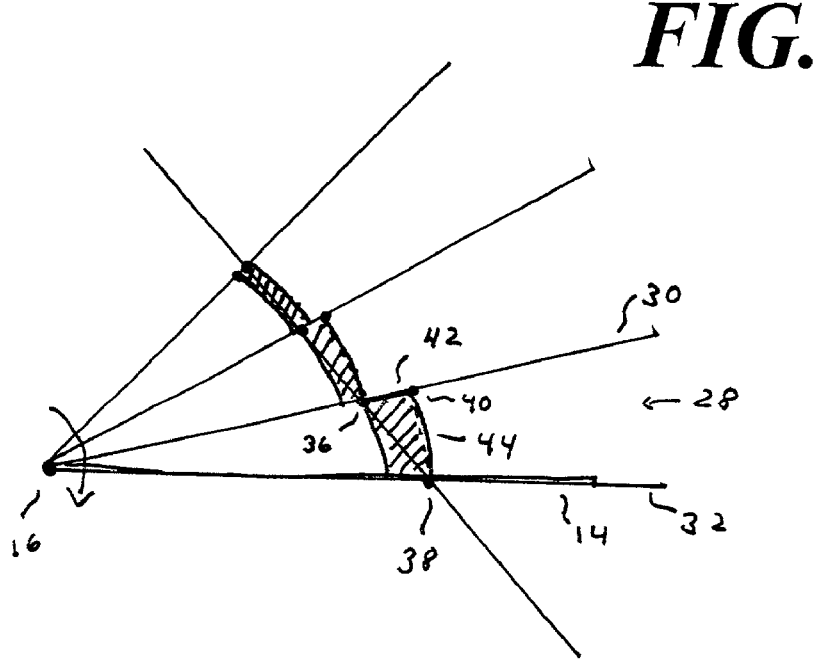

As the screen 14 traverses the slice 28, the connecting segment 42 rendered on that screen 14 traces out a planar strip 44 having a width and orientation corresponding to that of the connecting segment 42, as shown in FIG. 6. Because the threshold angles are close together, only a few pixels separate the entry point 36 and the projected exit point 40 on a plane. The connecting segment 42 is thus a short line segment. As a result, the planar strip 44 traced by the screen 14 is a only a few voxels wide.

As the screen 14 approaches the exit plane 32, the projected exit point 40 on the connecting segment 42 approaches the exit point 38. This exit point 38 is also the entry point for the following slice 33. As a result, the planar strips traced out by the connecting segments appear to merge smoothly into each other, resulting in the display of a smooth line in three dimensions.

Although the rasterization method has been discussed in the context of a cylindrical coordinate system, it is also applicable to coordinate systems that can be derived from a cylindrical coordinate system by rotations and projections. Certain volumetric display devices, such as the one illustrated in FIG. 1, introduce particular image distortions which require correction.

A first type of image distortion is made apparent when the light source 18 projects a static image on the spinning imaging screen 14. When it does so, the static image will appear to rotate about the center of the imaging screen 14. This type of distortion is referred to as "rotational distortion."

A second type of distortion is made apparent when the light source 18 projects an image of a rectangle on the imaging screen 14. When it does so, the rectangle appears distorted into a keystone. This type of distortion, referred to as "keystone distortion," occurs because the optical path from the bottom of the image on the screen 14 to the focus of the light source 18 is shorter than the optical path from the top of the image to the focus. Consequently, the top portion of the image projected by the light source 18 undergoes greater magnification than the bottom portion of the image.

For display devices that require correction for keystone and rotation distortions, it is desirable to execute an additional step between the calculation of cylindrical coordinates of the entry point 36 and the projected exit point 40 and the rasterization of the connecting segment 42. The cylindrical coordinates of the entry point 36 and the projected exit point 40 are calculated to have angle, radius and height of ($\theta_1$, $r_1$, $h_1$) and ($\theta_2$, $r_2$, $h_2$), respectively. The keystone distortion is corrected by a projection operation on the vectors ($r_1$, $h_2$) and ($r_2$, $h_2$) to give vectors ($r_1'$, $h_1'$) and ($r_2'$, $h_2'$). The rotation of the image of the light source 18 on the screen 14 is corrected by an opposite rotation about the center of the screen 14. The vector ($r_1'$, $h_1'$) is rotated by an angle $-\theta_1$, resulting in a vector ($x_1$, $y_1$). The vector ($r_2$,$h_2$) is rotated by an angle $-\theta_2$, resulting in a vector ($x_2$, $y_2$). The vector ($x_1$, $y_1$) specifies the point on the light source 18 which must be illuminated to render the entry point 36 on the imaging screen 14 at the instant when the rotating section 12 is rotated to an angle $\theta_1$. The vector ($x_2$, $y_2$) likewise specifies the point on the light source which must be illuminated to render the projected exit point 40 on the imaging screen 14 at the instant when the rotating section 12 is rotated to an angle $\theta_2$. The connecting line segment 42 is drawn on the light source 18 using the coordinates ($x_1$, $y_1$) and ($x_2$, $y_2$) as endpoints. Display designs resulting in optical paths that differ from that shown in FIG. 1 may require one or the other, or none of the foregoing distortion corrections.

The source code in the attached appendix teaches a particular implementation of the foregoing rasterization method. In the source code, the variable "x" is a vector and variables beginning with "q" are angles. The function "bres2d (x, x_, q)" implements a conventional Bresenham algorithm for rasterizing a line extending from x to x_ within a plane associated with slice q; the function "ang_add (q,q_)" adds angles q and q_; the operation "x->(r,h)" decomposes a vector in the r–h plane into its r component and its h component; and the operation "x=(r,h)" forms a vector in the r–h plane having components r and h.

The following source code makes reference to a projected coordinate system. The projected coordinate system is related to the cylindrical coordinate system described above through tumbling and keystoning operations. These operations are shown as italicized text in the following source code.

APPENDIX

```
line_polar_pos(q, d,gamma,phi,gs,h_t )
{
    th = ang_add(q,-phi);
    if( th >= TRIG_PI )
        th -= TRIG_PI;
    if( th<TRIG_PI_2 )
        sec_tan = sec_tan_table[th];
    else
        sec_tan = sec_tan_table[TRIG_PI-1-th];
    sec_tan -> (sec, tan);
    /* tmp = gamma*tan(theta) */
    tmp = gamma*tan;
    if( th>=TRIG_PI_2 )
        tmp=-tmp;
    /* r = abs(d*sec(theta)) */
    /* h = ((gamma*tan(theta))>>gs) + h_t */
    r = (d*sec)>>(1+_he_tan_shift);
    h = (((gamma*tan))>>gs) + h_t)<<16;
    return (r,h);
}
/* Calculate position along line in projected coordinate space*/
line_pos( q, d,gamma,phi,gs,h_t)
{
    x = line_polar_pos)q,d,gamma,phi,gs,h_t);
    cyln2projected(q,x);
    return (x);
}
/* Advance slice and carry state */
next_slice( *q, *x, x_ )
{
```

APPENDIX-continued

```
    /* increment the slice number */
    *q = ang_slice_inc(*q);
    /* leading edge of next slice is this slice's trailing edge */
    if( slice_number(*q) == 0 )
        *x = (x_ 0xffff0000)+0x00010000; /* Compensate for Pi jump
            by negating h */
    else
        *x = x_;
}
line_sub( q, q_end, x0, x1, d,gamma,phi,gs,h_t )
{
    x0 = cyln2projected(q,    x0);
    x1 = cyln2projected(q_end,x1);
    /* First vertex of line */
    if( q!=q_end )
        line_next_slice(&q,&x,x0);
    else
        x = x0;
    /* Draw middle slices of line */
    while(q!=q_end)  {
        x_ = re_line_pos(q, d,gamma,phi,gs,h_t);
        bres2d(q,x,x_);
        line_next_slice(&q,&x,x_);
    }
    /* Draw final slice of line */
    x_ = x1;
    bres2d (q,x,x_);
}
/* Draw a line in cylindrical (projected) coordinates from (q0,x0) to
(q1,x1) using cylindrical line constants d,gamma,phi,gs,h_t */
line(q0,x0, q1,x1, d,gamma,phi,gs,h_t)
{
    /* Front scan */
    q       = q0;
    q_end = q1;
    line_sub(q,q_end,x0,x1, d,gamma,phi,gs,h_t);
    /* Back scan */
    q       = ang_fixup(q    +TRIG_PI);
    q_end = ang_fixup(q_end+TRIG_PI);
    line_sub(q,q_end,x0,x1, d,gamma,phi,gs,h_t);
}
```

Additional subroutines for use with "projected" coordinate system

```
line_dekeystone (x)
{
    x -> (_xx,_yy); /* decode x vector into (x,y) components */
    int i = ((_yy + (FB_YLINES<<5)) >> 6) << 1; /* index in
    key_table */
    /* clip i to table size */
    if(i>1534)
        i=1534;
    else if(i<0)
        i=0;
    xx = ((_xx*key_table[i])      >> key_shift) + cx_ikey;
    yy = ((_yy*key_table[i+1])    >> key_shift) + cy_ikey;
    return (xx,yy);
}
line_detumble(q, x)
{
    x -> (r,h); /* extract r and h parts of x vector */
    /* 2d rotation:         */
    /* x = r*cos(th) + h*sin(th) */
    /* y = h*cos(th) - r*sin(th) */
    if(q>=TRIG_PI) {
        r= -r; /* Pi..2Pi maps back to 0..Pi with r negated */
        q -= TRIG_PI;
    }
    /* rotate by -q */
    x1 = r*cos(q);
    x2 = -h*sin(q);
    y1 = h*cos(q);
    y2 = r*sin(q);
    xx = (x1+x2)>>15; /* sin/cos tables have 15 fractional bits */
    yy = (y1+y2)>>15;
    return (xx,yy);
}
cyln2projected(q,x)
    x_ =line_dekeystone(x);
    x_ =line_detumble(q,x_);
```

APPENDIX-continued

```
        return x_;
}
```

The invention claimed is:

1. A method for rendering, on a volumetric display having a plurality of voxels, a rasterized line that approximates a desired line, said method comprising:
  positioning a screen at a first angular position in which said screen is coplanar with an entry plane;
  selecting a first voxel corresponding to an intersection of said desired line with said entry plane;
  selecting a second voxel corresponding to a projection onto said entry plane of an intersection of said desired line with an exit plane intersecting said entry plane;
  defining a connecting segment that connects said first voxel and said second voxel; and
  rendering selected voxels on said screen to rasterize said connecting segment.

2. The method of claim 1, wherein rendering said selected voxels comprises uniformly illuminating said selected voxels.

3. The method of claim 1, wherein rendering said selected voxels comprises rendering said selected voxels according to a selected illumination pattern.

4. The method of claim 3, further comprising selecting said illumination pattern to assign an illumination level of at least one of said selected voxels to be substantially zero.

5. The method of claim 4 further comprising selecting said at least one of said selected voxels from a group consisting of said first voxel and said second voxel.

6. The method of claim 1, further comprising continuing to render said selected voxels while rotating said screen
  from a first angular position in which said screen is coplanar with said entry plane
  to a second angular position in which said screen is coplanar with said exit plane.

7. The method of claim 1, wherein selecting said first voxel comprises:
  obtaining constants that define said line in Cartesian coordinates;
  obtaining an angle descriptive of said angular position of said entry plane; and
  on the basis of said constants and said angle, performing a trigonometric transformation to determine cylindrical coordinates of said intersection of said desired line with said entry plane.

8. The method of claim 7, wherein performing said trigonometric transformation comprises obtaining a value of a trigonometric function of an argument from a look-up table.

9. The method of claim 7, further comprising generating rotated coordinates corresponding to said first voxel, said rotated coordinates corresponding to rotation about a selected angle.

10. The method of claim 9, further comprising projecting said rotated coordinates to correct for keystoning.

11. The method of claim 7, further comprising generating projected coordinates corresponding to said first voxel, said projected coordinates being obtained by correction for keystone distortion.

12. The method of claim 8, wherein said look-up table has a number of entries that is at least double the number of angular positions at which said screen can be positioned.

13. The method of claim 1, wherein rendering said selected voxels on said screen comprises applying a Bresenham algorithm to obtain said selected voxels on the basis of said intersection of said desired line with said entry plane and said projection onto said entry plane of an intersection of said desired line with an exit plane.

14. The method of claim 1, further comprising:
  providing a first processor dedicated to carrying out said rendering of selected voxels on said screen to rasterize said connecting segment; and
  providing a second processor in communication with said first processor to provide said first processor with information indicative of said desired line.

15. A computer-readable medium having encoded thereon software for rendering, on a volumetric display having a plurality of voxels, a rasterized line that approximates a desired line, said software comprising instructions for:
  positioning a screen at a first angular position in which said screen is coplanar with an entry plane;
  selecting a first voxel corresponding to an intersection of said desired line with said entry plane;
  selecting a second voxel corresponding to a projection onto said entry plane of an intersection of said desired line with an exit plane intersecting said entry plane;
  defining a connecting segment that connects said first voxel and said second voxel; and
  rendering selected voxels on said screen to rasterize said connecting segment.

16. The computer-readable medium of claim 15, wherein said instructions for rendering said selected voxels comprise instructions for uniformly illuminating said selected voxels.

17. The computer-readable medium of claim 15, wherein said instructions for rendering said selected voxels comprise instructions for rendering said selected voxels according to a selected illumination pattern.

18. The computer-readable medium of claim 17, wherein said instructions for selecting said illumination pattern comprise instructions for assigning an illumination level of at least one of said selected voxels to be substantially zero.

19. The computer-readable medium of claim 18 wherein said instructions for selecting said illumination pattern comprise instructions for selecting said at least one of said selected voxels from a group consisting of said first voxel, and said second voxel.

20. The computer-readable medium of claim 15, wherein said software further comprises instructions for rendering said selected voxels while rotating said screen
  from a first angular position in which said screen is coplanar with said entry plane
  to a second angular position in which said screen is coplanar with said exit plane.

21. The computer-readable medium of claim 15, wherein said instructions for selecting said first voxel comprise instructions for:
  obtaining constants that define said line in Cartesian coordinates;
  obtaining an angle descriptive of said angular position of said entry plane; and
  on the basis of said constants and said angle, performing a trigonometric transformation to determine cylindrical coordinates of said intersection of said desired line with said entry plane.

22. The computer-readable medium of claim 21, wherein said instructions for performing said trigonometric transformation comprise instructions for obtaining a value of a trigonometric function of an argument from a look-up table.

23. The computer-readable medium of claim 21, wherein said software further comprises instructions for generating rotated coordinates corresponding to said first voxel, said rotated coordinates corresponding to rotation about a selected angle.

24. The computer-readable medium of claim 23, wherein said software further comprises instructions for projecting said rotated coordinates to correct for keystoning.

25. The computer-readable medium of claim 21, wherein said software further comprises instructions for generating projected coordinates corresponding to said first voxel, said projected coordinates being obtained by correction for keystone distortion.

26. The computer-readable medium of claim 15, wherein said instructions for rendering said selected voxels on said screen comprise instructions for applying a Bresenham algorithm to obtain said selected voxels on the basis of said intersection of said desired line with said entry plane and said projection onto said entry plane of an intersection of said desired line with an exit plane.

27. The computer-readable medium of claim 15, wherein said software further comprises instructions for:
providing a first processor dedicated to carrying out said rendering of selected voxels on said screen to rasterize said connecting segment; and
providing a second processor in communication with said first processor to provide said first processor with information indicative of said desired line.

28. A computer-readable medium having encoded thereon software for rendering a desired line in a volumetric display having a rotatable screen, said software comprising instructions for:
stepping said rotatable screen through a sequence of angular positions; and
at each angular position, rendering, on said rotatable screen, a rasterized approximation of a line segment containing an intersection of said desired line and said rotatable screen.

* * * * *